US008027305B1

(12) United States Patent
Rogers et al.

(10) Patent No.: US 8,027,305 B1
(45) Date of Patent: Sep. 27, 2011

(54) COMMUNICATION NETWORK AND METHOD EMPLOYING STATE INFORMATION IN PROVIDING COMMUNICATION SERVICES TO A MOBILE DEVICE

(75) Inventors: Frederick C. Rogers, Olathe, KS (US); Lyle T. Bertz, Lee's Summit, MO (US); Jeremy R. Breau, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 853 days.

(21) Appl. No.: 11/620,831

(22) Filed: Jan. 8, 2007

(51) Int. Cl.
*H04W 4/00* (2009.01)

(52) U.S. Cl. ......... 370/331; 455/436; 455/299; 375/267

(58) Field of Classification Search .......... 455/436–444, 455/450–453, 299; 370/329–337; 244/158.4; 380/272; 375/267
See application file for complete search history.

(56) References Cited

U.S. PATENT DOCUMENTS

| | | | | |
|---|---|---|---|---|
| 6,909,899 | B2 * | 6/2005 | Wang et al. | 455/436 |
| 6,985,464 | B2 * | 1/2006 | Harper et al. | 370/331 |
| 7,139,926 | B1 * | 11/2006 | Madhav et al. | 714/4.11 |
| 7,277,455 | B2 * | 10/2007 | Hsu et al. | 370/468 |
| 7,426,195 | B2 * | 9/2008 | Mukherjee et al. | 370/328 |
| 2003/0022654 | A1 | 1/2003 | Kakani et al. | |
| 2003/0035410 | A1 * | 2/2003 | Laroia et al. | 370/350 |
| 2004/0180677 | A1 | 9/2004 | Harris et al. | |
| 2005/0025116 | A1 * | 2/2005 | Chen et al. | 370/349 |
| 2005/0286471 | A1 * | 12/2005 | Yang et al. | 370/331 |
| 2007/0083669 | A1 * | 4/2007 | Tsirtsis et al. | 709/238 |
| 2007/0165574 | A1 | 7/2007 | Srey et al. | |
| 2007/0254661 | A1 * | 11/2007 | Chowdhury et al. | 455/436 |

OTHER PUBLICATIONS

USPTO Office Action Summary dated Feb. 2, 2011 from U.S. Appl. No. 11/620,954.

* cited by examiner

*Primary Examiner* — Kent Chang
*Assistant Examiner* — Marcus Hammonds

(57) ABSTRACT

A method providing communication services to a mobile device is presented. In the method, a number of radio access networks are coupled with a packet data network by way of a number of access nodes. Each of a number of packet data flows between the mobile device and the packet data network are facilitated by way of the one of the radio access networks and one of the access nodes. State information regarding the packet data flows is exchanged between those of the access nodes facilitating at least one of the packet data flows so that each of those nodes possesses the state information for each of the packet data flows. One of the access nodes is then selected for facilitating one of the packet data flows based on the state information.

24 Claims, 15 Drawing Sheets

COMMUNICATION NETWORK AND METHOD EMPLOYING STATE INFORMATION IN PROVIDING COMMUNICATION SERVICES TO A MOBILE DEVICE

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

Aspects of the invention relate generally to communication networks, and more particularly to employing state information in providing communication services to a mobile device.

2. Description of the Prior Art

Since the advent of mobile communication devices, such as cell phones and personal digital assistants (PDAs), the number of different types of communication in which these devices may engage has expanded significantly. Thanks to advancements in the devices themselves, and the communication networks with which they communicate, users may now view web pages on the World Wide Web (WWW), engage in telephonic communications over the Internet by way of Voice-over-Internet-Protocol (VoIP), view and hear streaming audio and video, and access e-mail, among others. Typically, these communications occur over a data packet communication protocol, such as Internet Protocol (IP).

Communication networks that contain multiple smaller networks have been devised to allow such access by mobile devices to occur while the mobile device is in motion. In one example, multiple radio access networks (RANs), each of which provide communication service to a mobile device over a specific geographic area, may be coupled with a packet data network, such as an Internet Protocol (IP) network. As a mobile device moves from one area to another, responsibility for providing communication service for the mobile device is transferred, or "handed off," from one RAN to the next to allow the mobile device to continue to access the attached packet data network. In addition, the Mobile IP communications protocol allows the mobile device to maintain a permanent IP address while moving from one RAN to another.

However, this process of handing off typically introduces a significant delay or interruption in the provision of the communication service from the standpoint of the user. "Real-time" communication services, such as audio, video and VoIP, may be particularly disrupted during the handoff.

SUMMARY OF THE INVENTION

One embodiment of the invention, described in greater detail below, involves a method for providing communication service to a mobile device. In the method, a number of radio access networks are coupled with a packet data network by way of a number of access nodes. Each of a number of packet data flows between the mobile device and the packet data network are facilitated by one of the radio access networks and one of the access nodes. State information regarding the packet data flows is exchanged among the access nodes that facilitate at least one of the packet data flows, resulting in each of the access nodes that facilitate a packet data flow possessing the state information for each of the flows. Based on this state information, one of the access nodes is selected for facilitating one of the packet data flows.

Another embodiment of the invention supplies a communication network for providing communication services to a mobile device. The communication network includes a packet data network, a number of radio access networks configured to communicate with a mobile device, and a number of access nodes coupling the packet data network with the radio access networks. The access nodes are configured to facilitate each of a number of packet data flows between the mobile device and the packet data network by way of one of the radio access networks and one of the access nodes. The access nodes facilitating the packet data flows are also configured to exchange state information concerning the packet data flows among themselves so that each of these nodes possesses the state information for each of the packet data flows. Based on this state information, the access nodes are configured to select one of the access nodes for facilitating one of the packet data flows.

Additional embodiments and advantages of the present invention will be ascertained by those skilled in the art upon perusal of the following detailed description, taken in conjunction with the accompanying drawings.

DETAILED DESCRIPTION OF THE INVENTION

Figure 1A:
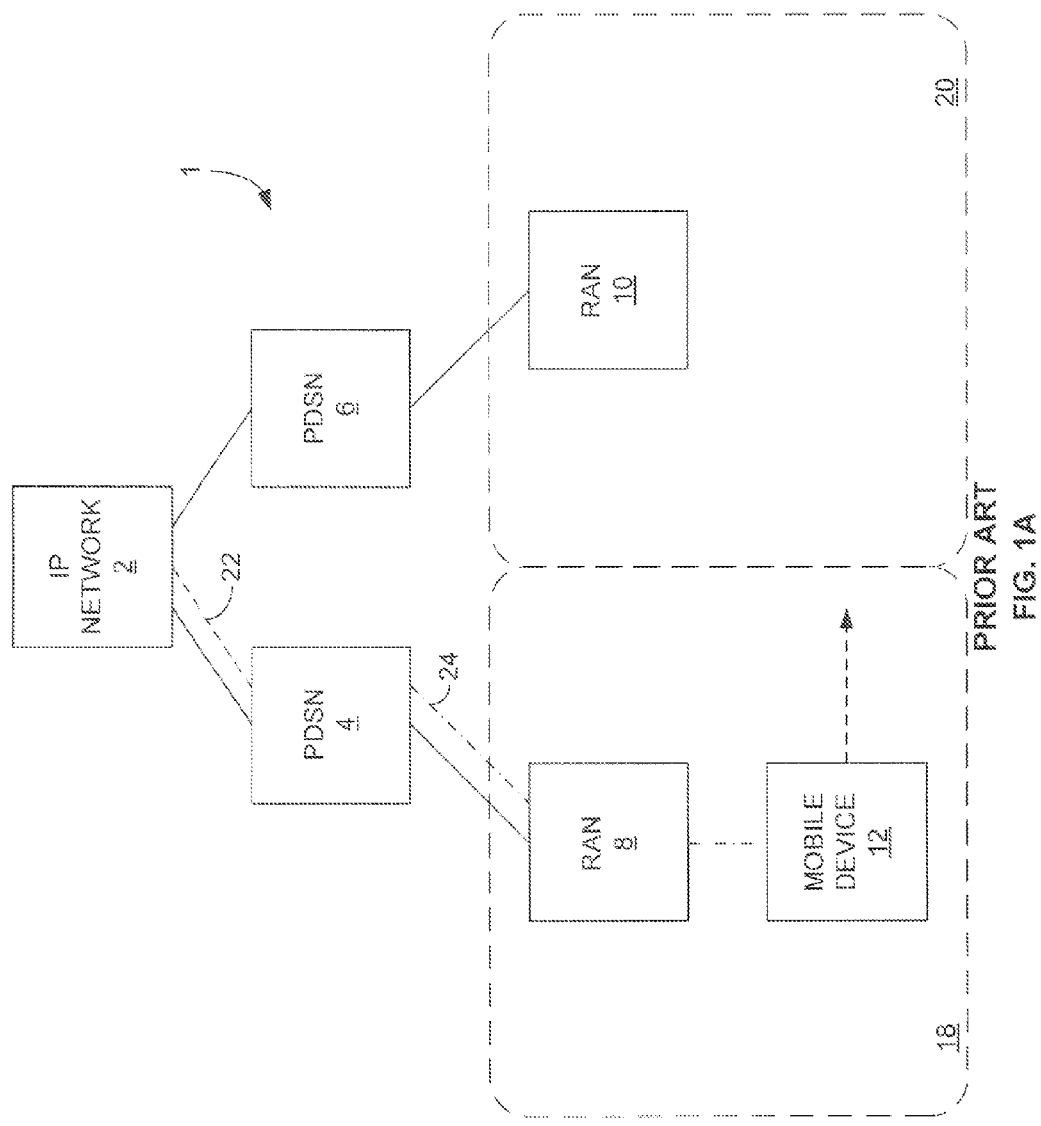
FIG. 1A is a simplified block diagram of a communication network from the prior art, wherein a mobile device is being serviced by a first RAN.
Figure 1B:
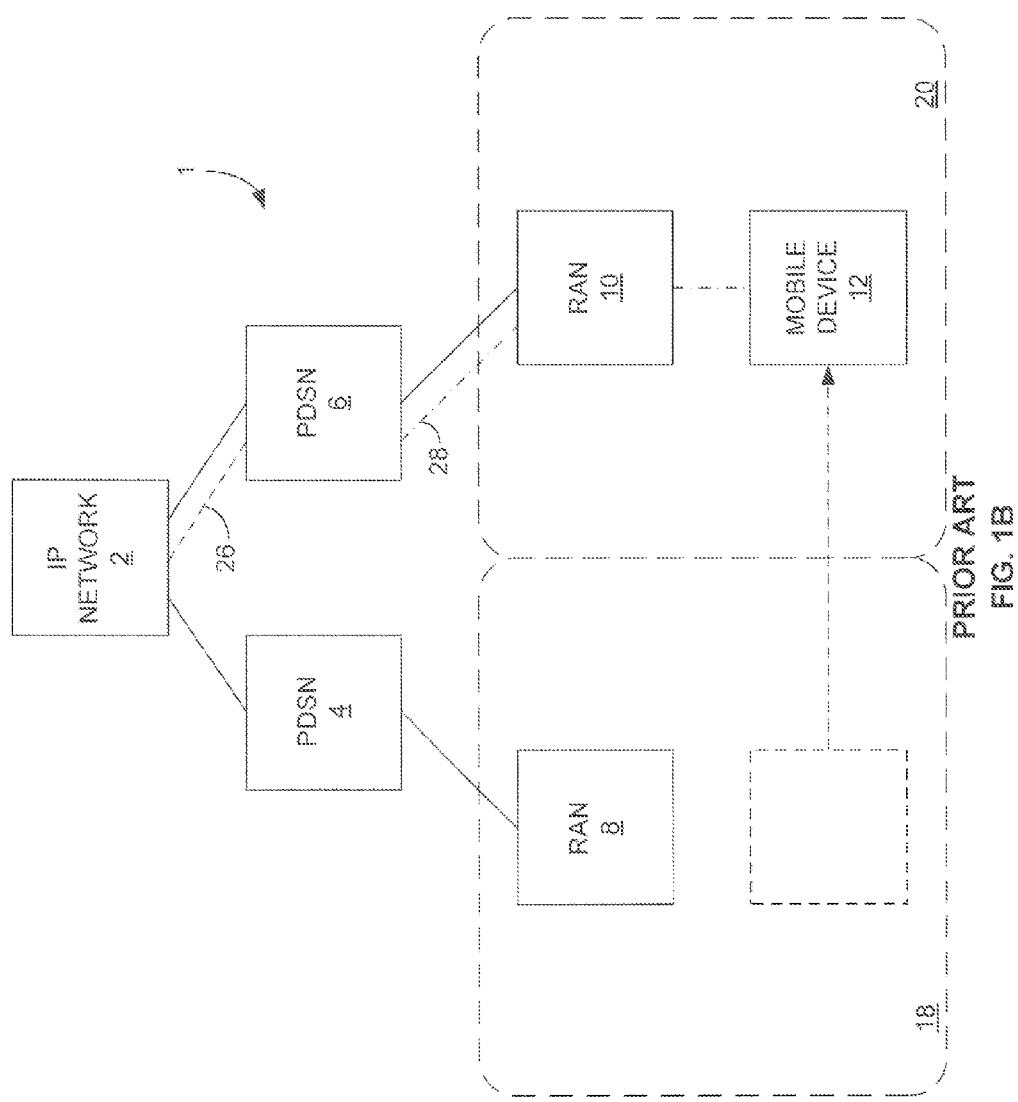
FIG. 1B is a simplified block diagram of the communication network of FIG. 1A from the prior art, wherein the mobile device is being serviced by a second RAN.

FIGS. 1A and 1B present a simplified view of a communication network 1 from the prior art providing access for a mobile device 12 to an Internet Protocol (IP) network 2. The communication network 1 also includes two radio access networks (RANs) 8, 10, each of which provide communication service within an area 18, 20, respectively. In addition, a first packet data servicing node (PDSN) 4 couples the first radio access network 8 with the IP network 2, and a second PDSN 6 couples the second RAN 10 with the IP network 2. Thus, the first PDSN 4 and the second PDSN 6 act as access nodes for the first RAN 8 and the second RAN 10, respectively, in communicating with the IP network 2.

As depicted in FIG. 1A, the mobile device 12 is initially located within the area 18 serviced by the first RAN 8. As a result, an IP data flow between the mobile device 12 and the IP network 2 is routed through the first PDSN 4 and the first RAN 8. The IP data flow includes a Mobile IP session 22 between the IP network 2 and the PDSN 4, as well as a point-to-point protocol (PPP) session 24 between the PDSN 4 and the mobile device 12. As the mobile device 12 moves from the area 18 serviced by the first RAN 8 to the area 20 of the second RAN 10, illustrated in FIG. 1B, the mobile device 12 is handed off to the second PDSN 6 and the second RAN 10. In other words, the handoff occurs at both the Mobile IP level and the PPP level. As a result, the entire path for the IP data flow between the IP network 2 and the mobile device 12 must be reconstructed through the second PDSN 6 and the second RAN 10. This path includes a new Mobile IP session 26 between the IP network 2 and the second PDSN 6, as well as a new PPP session 28 between the second PDSN 6 and the mobile device 12. The same process is repeated each time the mobile device 12 transitions from one radio access network to another. This implementation of an entirely different path between the IP network 2 and the mobile device 12 typically causes a significant delay or interruption in the data being transferred between the IP network 2 and the device 12. The primary reason for the delay is that the IP session 26 is typically dropped while the transition occurs, since no IP data flow is active during that time. Such a delay, which may be several seconds in length, may be especially disconcerting when delivery of "real-time" services, such as VoIP, video, and audio, is involved.

To address this concern, one embodiment of the invention is provided in a method 100 for allowing mobility of packet data flow in a communication network. The method 100 is depicted by way of a flow diagram in FIG. 2. In the method 100, a first packet data flow between a mobile device and a packet data network is facilitated by way of a first radio access network, and by way of a first access node coupling the packet data network with the first radio access network (operation 102). A boundary crossing of the mobile device from a first area serviced by the first radio access network to a second area serviced by a second radio access network is detected (operation 104). After the boundary crossing is detected, the mobile device is handed off from the first radio access network to the second radio access network (operation 106). Thereafter, the first packet data flow between the mobile device and the packet data network is maintained by way of a packet data connection between the first access node and the second radio access network (operation 108).

Figure 3A:
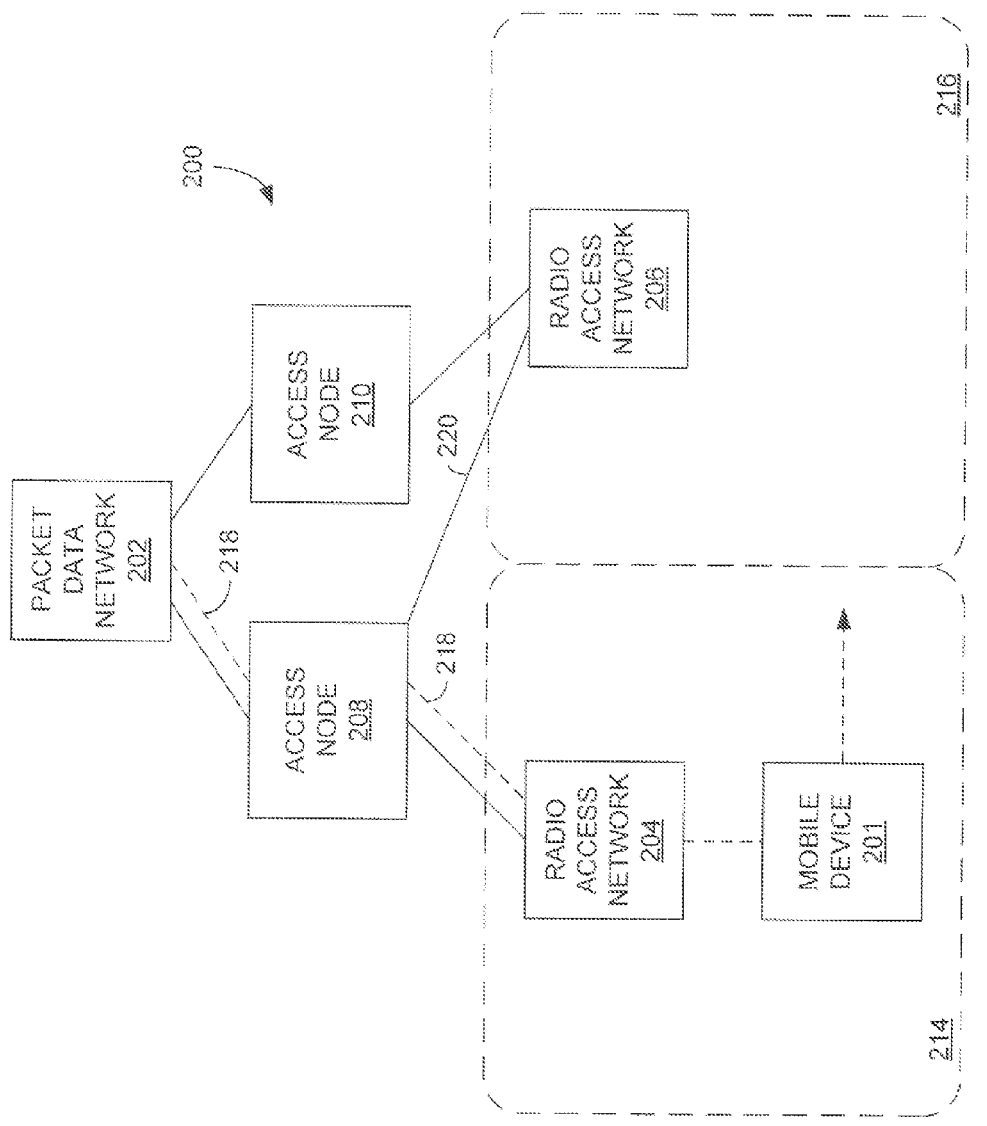
FIG. 3A is a simplified block diagram of a communication network according to an embodiment of the invention for allowing mobility of packet data flow, wherein a mobile device engages in a first packet data flow with a first radio access network.
Figure 3B:
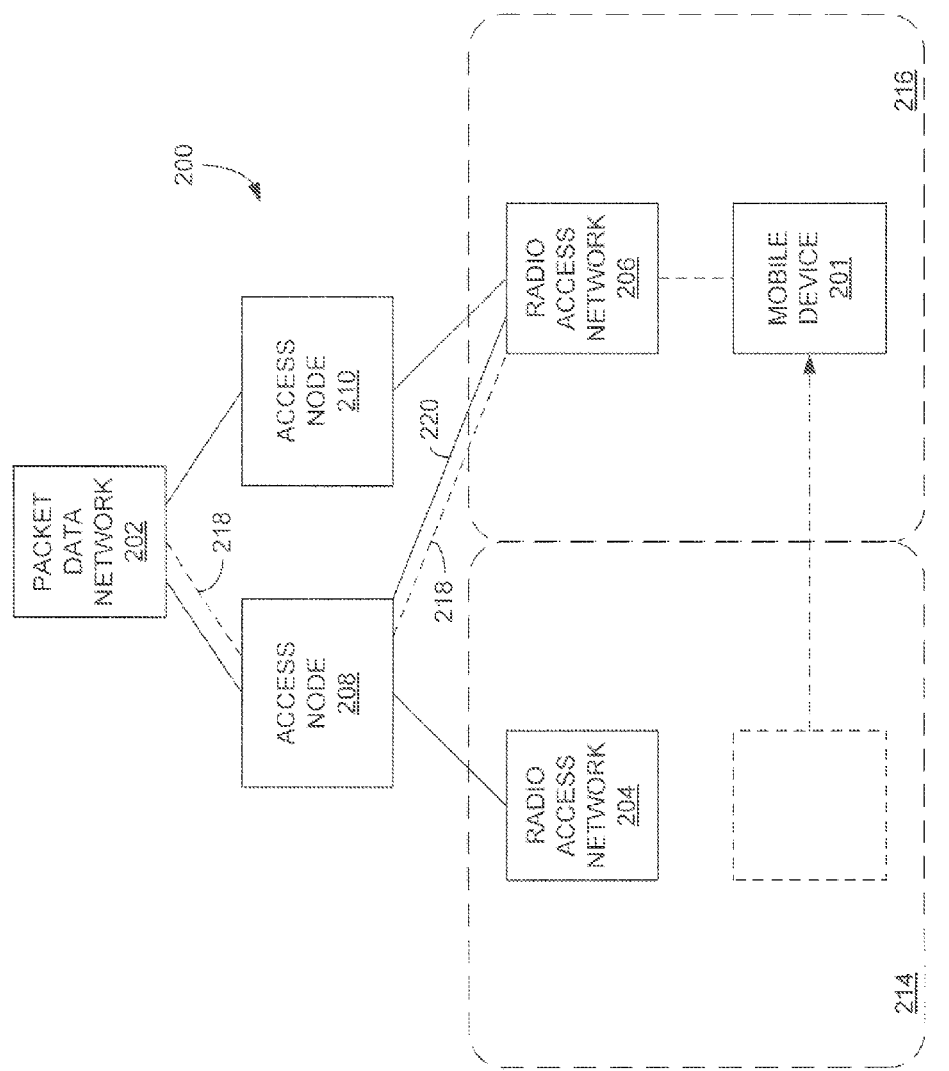
FIG. 3B is a simplified block diagram of the communication network of FIG. 3A according to an embodiment of the invention, wherein the mobile device engages in the first packet data flow with a second radio access network.

FIGS. 3A and 3B illustrate another embodiment: a communication network 200 allowing mobility of packet data flow. FIGS. 3A and 3B are simplified in nature, and thus do not display some components normally employed in a communication system. The communication network 200 includes, in part, a packet data network 202, a first radio access network 204 and a second radio access network 206. The first radio access network 204 is configured to service a mobile device 201 when located within a first area 214, and the second radio access network 206 is configured to service the mobile device 201 when located within a second area 216. Also included in the network 200 is a first access node 208 coupling the first radio access network 204 with the packet data network 202, as well as a second access node 210 coupling the second radio access network 206 with the packet data network 202. The first radio access network 204 and the first access node 208 are configured to facilitate a first packet data flow 218 between the mobile device 201 and the packet data network 202, as displayed in FIG. 3A. The first radio access network 204 is further configured to detect a boundary crossing of the mobile device 201 from the first area 214 to the second area 216. The boundary crossing is depicted graphically in FIG. 3B. In response to detecting the boundary crossing, the first radio access network 204 is further configured to hand off the mobile device 201 to the second radio access network 206. After receiving the mobile device 201, the second radio access network 206 is configured to maintain the first packet data flow 218 between the mobile device 201 and the packet data network 202 by way of a packet data connection 220 between the first access node 208 and the second radio access network 206.

Figure 4A:
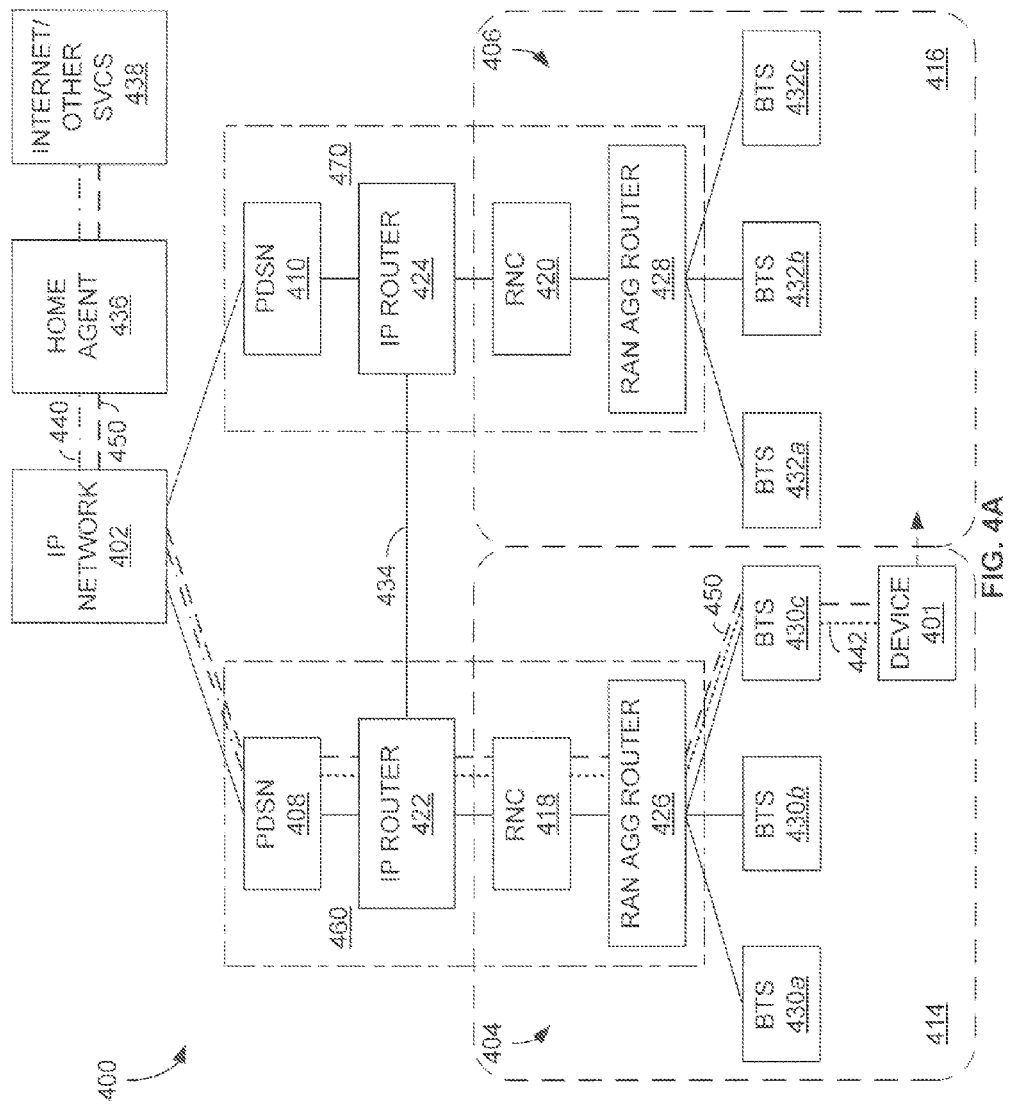
FIG. 4A is a simplified block diagram of a communication network according to another embodiment of the invention for allowing mobility of packet data flow, wherein a mobile device engages in a first packet data flow with a first radio access network.
Figure 4B:
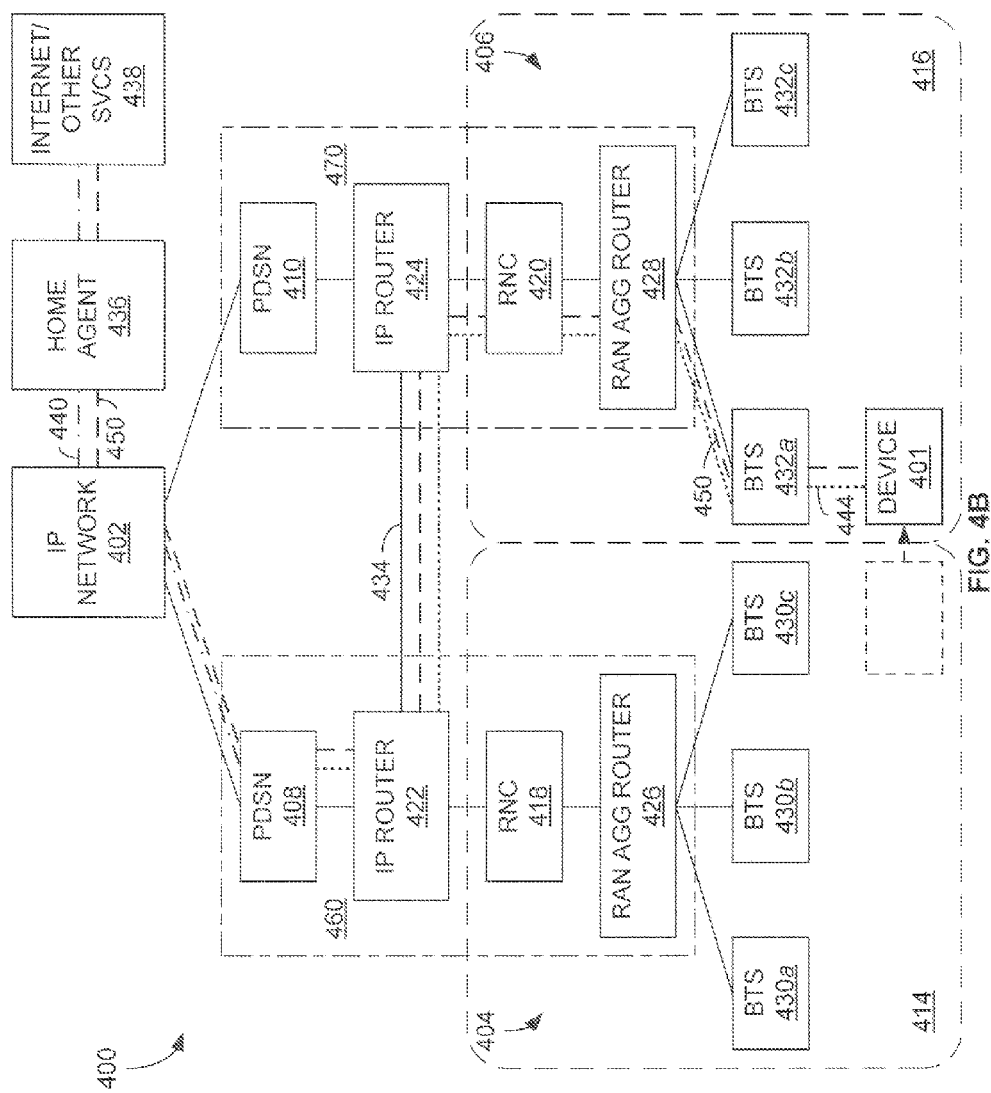
FIG. 4B is a simplified block diagram of the communication network of FIG. 4A, wherein the mobile device engages in the first packet data flow with a second radio access network.
Figure 4C:
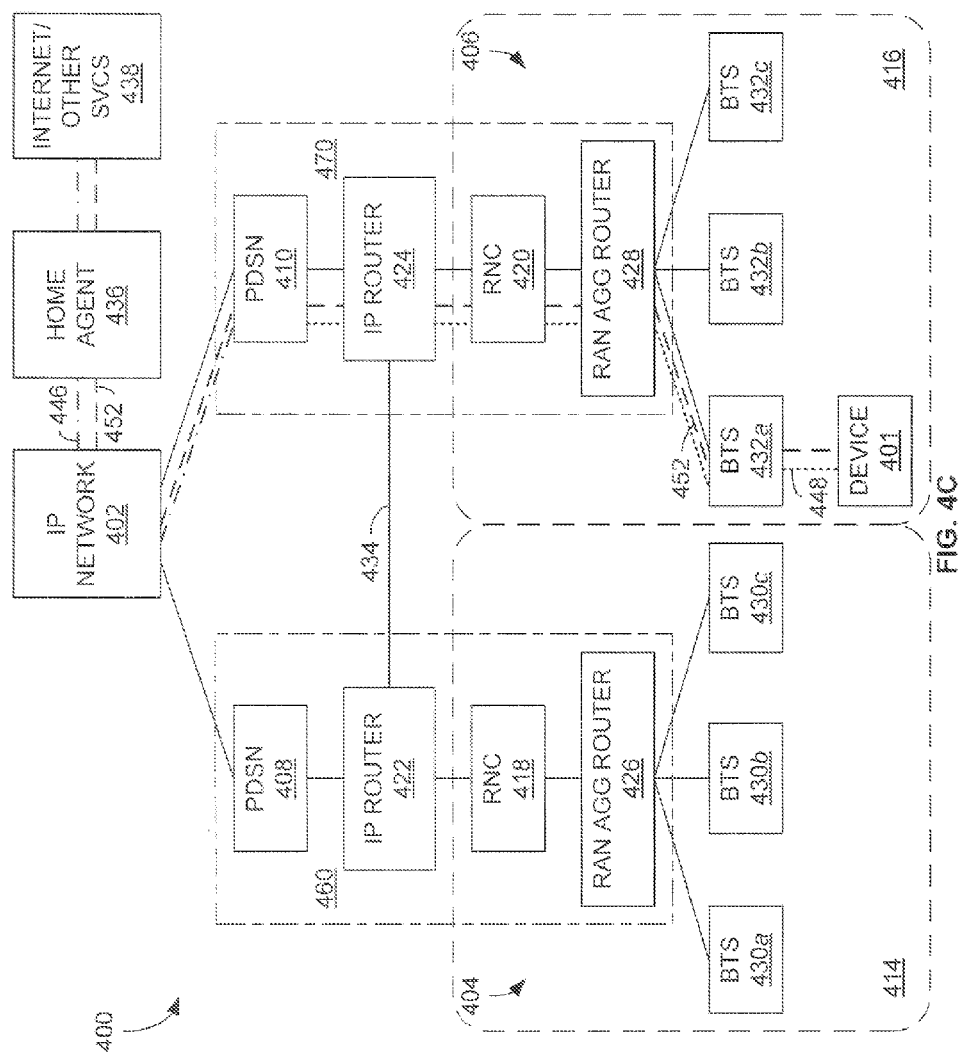
FIG. 4C is a simplified block diagram of the communication network of FIG. 4A, wherein the mobile device engages in a second packet data flow with the second radio access network.

Another embodiment—a communication network 400—is depicted in FIGS. 4A-4C. While a significant number of components of the communication network 400 are presented in FIGS. 4A-4C, other components, such as switches, routers, controllers, and the like, are not displayed or described in order to lend clarity and brevity to the discussion of the communication network 400 presented below.

Included in the communication network 400 is an Internet Protocol (IP) network 402. In one embodiment, the IP network 402 is a wide-area network (WAN) providing content by way of data packets to mobile devices, such as the mobile device 401 shown in FIGS. 4A-4C. Coupled with the IP network 402 are a first packet data servicing node (PDSN) 408 and a second PDSN 410. Other PDSNs not shown in FIGS. 4A-4C may also be coupled with the IP network 402. The first PDSN 408 is coupled by way of a first IP router 422 to a first radio access network (RAN) 404. Similarly, the second PDSN 410 is coupled with a second RAN 406 by way of a second IP router 424. The RANs 404, 406 are described in greater detail below. While only one router 422, 424 is shown coupling its associated PDSN 408, 410 with its corresponding RAN 404, 406, other routers and similar network connection devices may also be employed. Additionally, the first and second IP routers 422, 424 are coupled together by way of an IP connection 434.

Generally, the PDSNs 408, 410 serve as access nodes or gateways to the IP network 402 for mobile devices being serviced by the RANs 404, 406. In the specific embodiment illustrated in FIGS. 4A-4C, the first PDSN 408 communicates with a home agent 436 by way of a Mobile IP session 440. The home agent 436 stores information about mobile devices, such as the mobile device 401. Such information may include, for example, the IP address of the mobile device 401 for routing IP traffic to the mobile device 401. In conjunction with the IP network 402, the home agent 436 provides access to the Internet 438 and other services, such as streaming audio and video, data, and VoIP. In one embodiment, the IP session 440 may be implemented as an IP tunnel. In another implementation, a simple IP session may be employed in lieu of the Mobile IP session 440 for communication between the first PDSN 408 and the Internet 438. Under that scenario, the first PDSN 408 may communicate with the Internet 438 and other services via a gateway router (not shown in FIG. 4) instead of the home agent 436.

The first RAN 404 provides communication services to mobile devices, such as the mobile device 401 shown in FIGS. 4A-4C, located within a first geographic area 414. The first RAN 404 includes a radio network controller (RNC) 418, a RAN aggregation router 426, and several base transceiver stations (BTSs) 430*a*, 430*b*, 430*c*. More or fewer BTSs 430 may be employed within the first RAN 404. The RNC 418 couples the RAN aggregation router 426 with the first IP router 422, and the RAN aggregation router 426 couples the RNC 418 with the BTSs 430.

In operation, each of the BTSs 430 communicates with one or more mobile devices within a portion of the first area 414. As a mobile device moves about the first area 414, the device may be handed off from one BTS 430 to another as necessary to maintain the service provided to the device. The RAN aggregation router 426 aggregates communication traffic from the BTSs 430 and forwards this traffic to the RNC 418. Also, the RAN aggregation router 426 receives communication traffic from the RNC 418 and directs it as necessary to the appropriate BTS 430 for ultimately delivery to the intended destination mobile device. The RNC 418 provides control and management functions for the RAN 404 in general, and the BTSs 430 more particularly. In addition, the RNC 418 provides the functionality for handing off a mobile device to another RAN, and to receive and support a mobile device being handed off by another RAN.

Similar to the first RAN 404, the second RAN 406 provides communication services to mobile devices, such as the mobile device 401 shown in FIGS. 4A-4C, located within a second geographic area 416. The second RAN 406 includes an RNC 420, a RAN aggregation router 428, and several BTSs 432*a*, 432*b*, 432*c*. As with the first RAN 404, more or fewer BTSs 432 may be utilized within the second RAN 406. The RNC 420 couples the RAN aggregation router 428 with the second IP router 424, while the RAN aggregation router 428 couples the radio network controller 420 with the BTSs 432. Each of the components 420, 428, 432 of the second RAN 406 provide functionality corresponding to that associated with their counterparts 418, 426, 430 of the first RAN 404.

In one embodiment, the first PDSN 408 is co-located with the first IP router 422 and the RNC 418 of the first RAN 404. The associated RAN aggregation router 426 may also be located therewith. This location may be regarded as a first switch site 460 for the first RAN 404. Likewise, the second PDSN 410, the second IP router 424, as well as the RNC 420 and the RAN aggregation router 428 of the second RAN 406, may be located together at a second switch site 470 for the second RAN 406.

Figure 5:
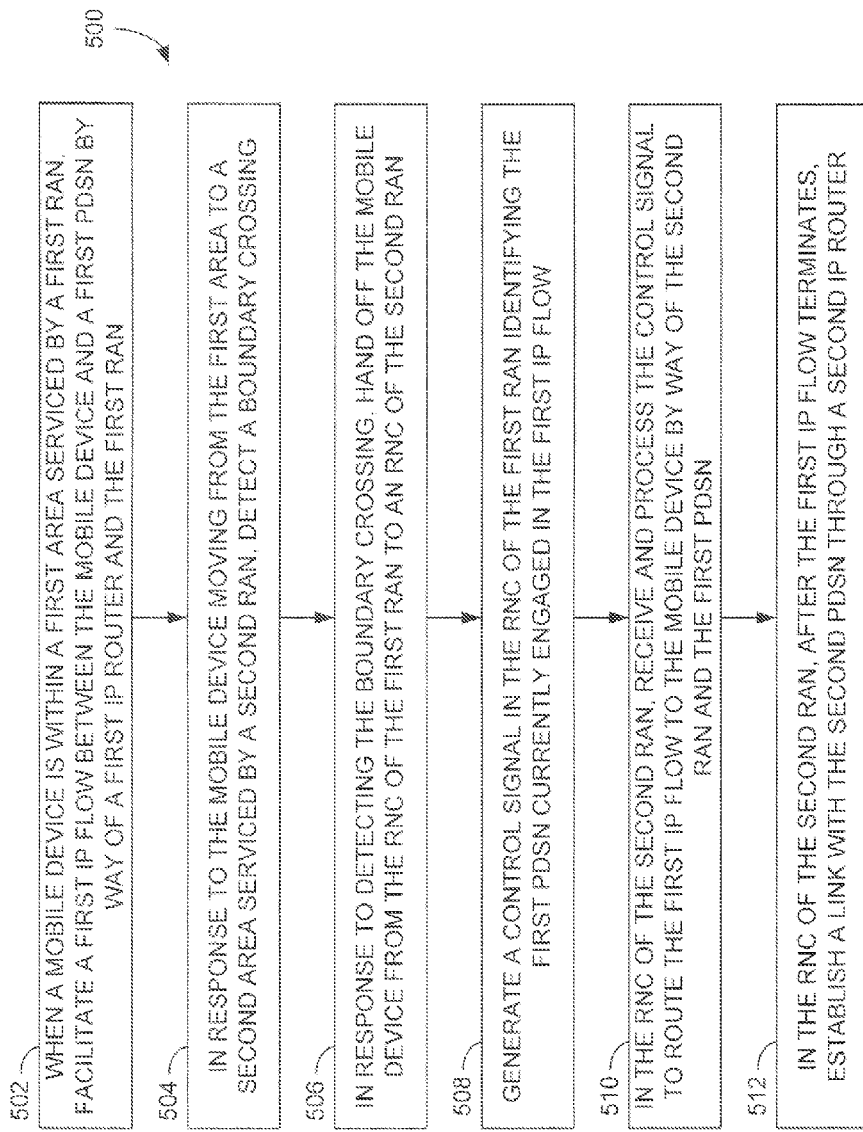
FIG. 5 is a flow diagram of a method according to another embodiment of the invention for allowing mobility of packet data flow in a communication network.

A method 500 for allowing mobility of packet data flow in a communication system is shown by way of a flow diagram in FIG. 5. While the method 500 is described with specific reference to the communication system 400 discussed above, other communication network configurations compatible with the method 500 may be used in other embodiments.

While the mobile device 401 is located within the first area 414, as shown in FIG. 4A, the first RAN 404, in conjunction with the first IP router 422 and the first PDSN 408, facilitate a first IP flow 450 between the mobile device 401 and the IP network 402 (operation 502). In the specific example of FIG. 4A, the IP flow 450 extends beyond the IP network 402, through the home agent 436, to the Internet and/or other services 438. As shown in FIG. 4A, the IP flow contains at least two portions. As described earlier, the first PDSN 408 communicates with the home agent 436 by way of a Mobile IP session 440. In another example, the first PDSN 408 may communicate with the Internet 438 by way of a simple IP session through a gateway router or similar device instead of the home agent 436, as indicated above. Also, in one embodiment, the first RAN 404 engages in a point-to-point protocol (PPP) session 442 from the first PDSN 408 and the first IP router 422 through the RAN 404 to the mobile device 401. Together, the IP session 440 and the PPP session 442 maintain the IP packet data flow 450 between the Internet 438 and the mobile device 401. The mobile device 401 may move within the first area 414, thus being serviced by any of the BTSs 430 within the first RAN 404 by way of handoffs from one BTS 430 to another as directed by the RNC 418. These handoffs among BTSs 430 within the first RAN 404 are typically accomplished while maintaining the IP flow 450. As discussed earlier, the IP packet data flow may represent a VoIP call, a video or audio stream, a data file transfer, or other type of communication.

As shown in FIG. 4A, the mobile device 401 at some point may cross a boundary between the first area 414 and the second area 416, thus requiring the second RAN 406 to assume the responsibility of providing communication services to the mobile device 401 from the first RAN 404. While the first area 414 and the second area 416 are shown as mutually exclusive but adjoining areas serviced by neighboring RANs 404, 406, the areas 414, 416 may be more widely separated physically, or may overlap, in other embodiments. In response to the mobile device 401 entering the second area 416, the RNC 418 of the first RAN 404 detects the boundary crossing (operation 504). Further, in response to detecting the boundary crossing, the RNC 418 of the first RAN 404 hands off the mobile device 401 to the RNC 420 of the second RAN 406 (operation 506).

After this handoff, the first packet data flow 450 is maintained between the mobile device 401 and the Internet or other service 438, as depicted in FIG. 4B. To accomplish this task, in one embodiment, the RNC 418 of the first RAN 404 generates a control signal identifying the first PDSN 408 currently engaged in the first IP data flow 450, and transmits the control signal to the RNC 420 of the second RAN 406 (operation 508). The control signal may be transmitted by way of the first IP router 422 and the second IP router 424 shown in FIG. 4B, although other possible paths between the RNCs 418, 420 may be used in other embodiments. In one implementation, the control signal may be provided as part of the signaling information used between the RNCs 418, 420 for completing the handoff therebetween of the mobile device 401. In another example, the control signal is information embedded in an IP packet header transferred between the RNCs 418, 420.

The RNC 420 of the second RAN 406 then receives and processes the control signal to route the first packet data flow 450 to the mobile device 401 by way of the second RAN 406 and the first PDSN 408 (operation 510). In the specific configuration of FIG. 4B, the first IP packet data flow 450 is directed through the first and second IP routers 422, 424 implementing the IP packet data connection 434 therebetween. From the second IP router 424, the first IP flow continues 450 through the RNC 420, the RAN aggregation router 428 and one of the BTSs 432 of the second RAN 406 to the mobile device 401. Such a path is possible as long as the RNC 420 of the second RAN 406 can exchange IP traffic with the first PDSN 408 supporting the original flow 450. By continuing to use the first PDSN 408, a handoff at the PDSN level is not required. The IP session 440 associated with the first IP flow 450 is thus less likely to be dropped, and the first IP flow 450 is maintained. Thus, real-time-oriented services supported between the Internet 438 or the IP network 402 and the mobile device 401 are more likely to retain their real-time quality.

After the first IP flow 450 is terminated or interrupted, cessation of the IP session 440 between the first PDSN 408 and the home agent 436 is no longer an issue. Thus, as shown in FIG. 4C, a subsequent IP packet data flow 452 is facilitated by way of the second RAN 406 and the second PDSN 410. More specifically, after the first IP flow 450 terminates, the RNC 420 of the second RAN 406 establishes a link with the second, more optimal PDSN 410 through the second IP router 424 (operation 512) so that the second IP flow 452 involving the mobile device 401 will be directed therethrough. As a result of this new configuration, a second IP session 446 between the second PDSN 410 and the home agent 436 is initiated. A new PPP session 448 between the second PDSN 410, through the second IP router 424 and the second RAN 406, to the mobile device 401, is also supported. As a result, the second IP flow 452 is routed through an optimal path involving the second PDSN 410 more closely associated with the second RAN 406, thus utilizing more locally-positioned resources for the second IP flow 452. The close association between the second PDSN 410 and the second RAN 406 is emphasized in the specific case of FIGS. 4A-4C, in which the second PDSN 410 and the RNC 420 are located at the same second switch site 470.

In one embodiment, termination of the first IP flow 450 may be determined by a minimum time period of inactivity, or lack of data packets, in the first IP flow 450. For example, a contiguous time period of 20 seconds of inactivity in the first IP flow 450 may be a strong indication to the RNC 420 of the second RAN 406 that the first IP flow 450 has concluded. Other time periods for determining the presence of an active IP flow may be utilized in other embodiments, and may depend on several factors, such as the type of network components involved and the type of data being transferred during the first IP flow 450.

Figure 6:
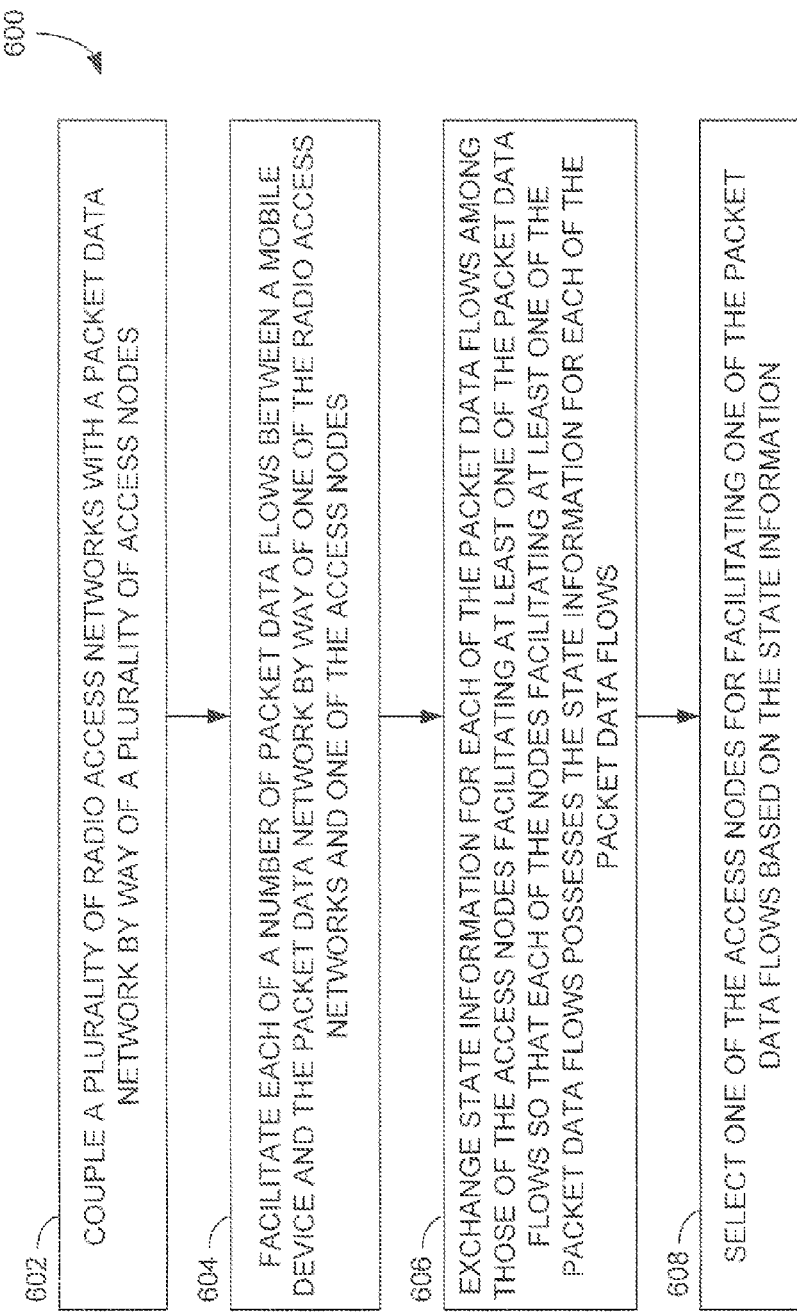
FIG. 6 is a flow diagram of a method employing state information for providing communication services to a mobile device.

While the example of FIGS. 4A-4C and FIG. 5 discuss a single IP flow being facilitated at any point in time, the communication network 400, as well as other embodiments described herein, may facilitate more than one packet data flow concurrently. In one embodiment, state information regarding each of the packet data flows may be exchanged and maintained among a number of access nodes to allow more efficient configuration of the path for each of the packet data flows. One example of a method 600 employing such state information for providing communication services to a mobile device is illustrated in the flow diagram of FIG. 6.

Figure 2:
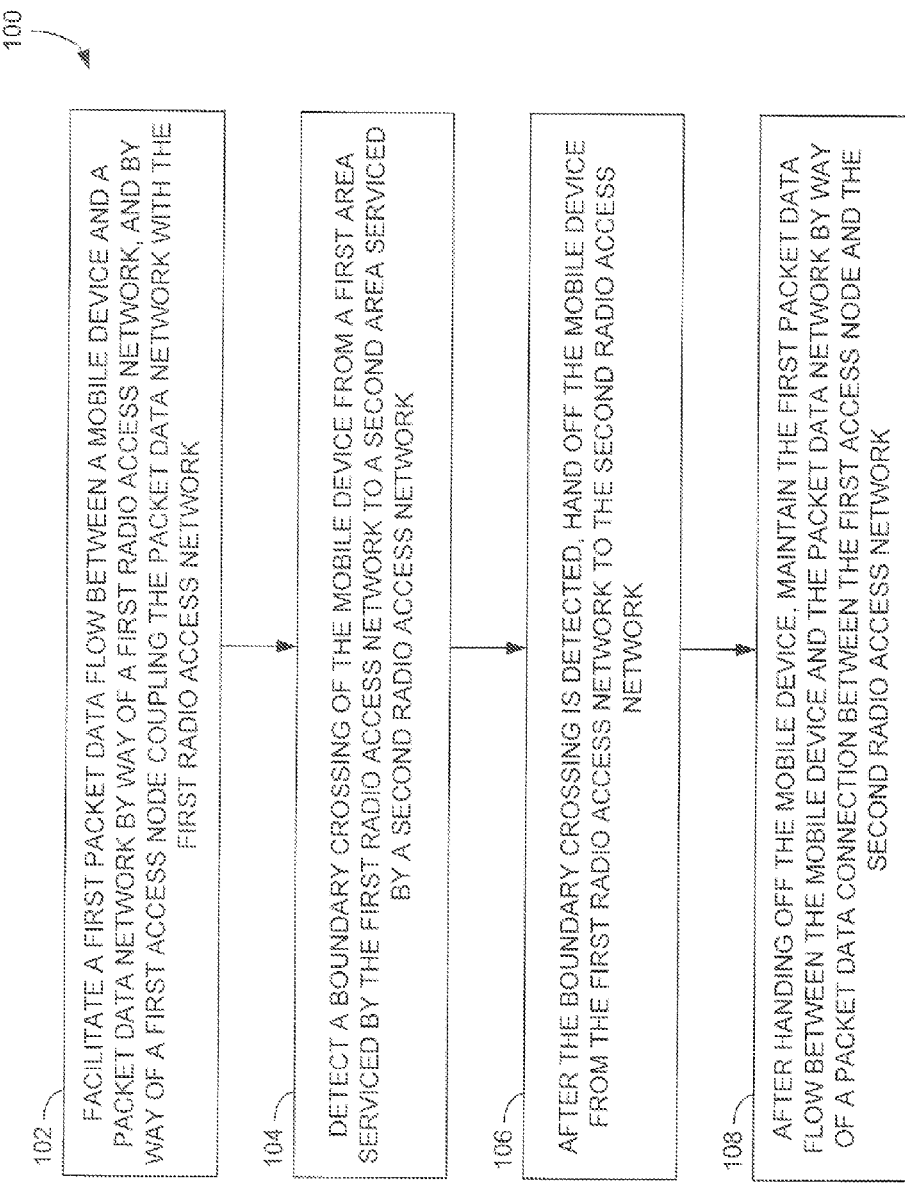
FIG. 2 is a flow diagram of a method according to an embodiment of the invention for allowing mobility of packet data flow in a communication network.

In the method 600, a plurality of radio access networks are coupled with a packet data network by way of a plurality of access nodes (operation 602). The communication network 200 depicted in FIG. 2 is one example of such a configuration. Each of a number of packet data flows between the mobile device and the packet data network are facilitated by way of one of the radio access networks and one of the access nodes (operation 604). State information for each of the packet data flows is exchanged among those of the access nodes facilitating at least one of the packet data flows so that each of those nodes possesses the state information for each of the packet data flows (operation 606). Based on the state information, one of the access nodes is selected for facilitating one of the packet data flows (operation 608).

Figure 7:
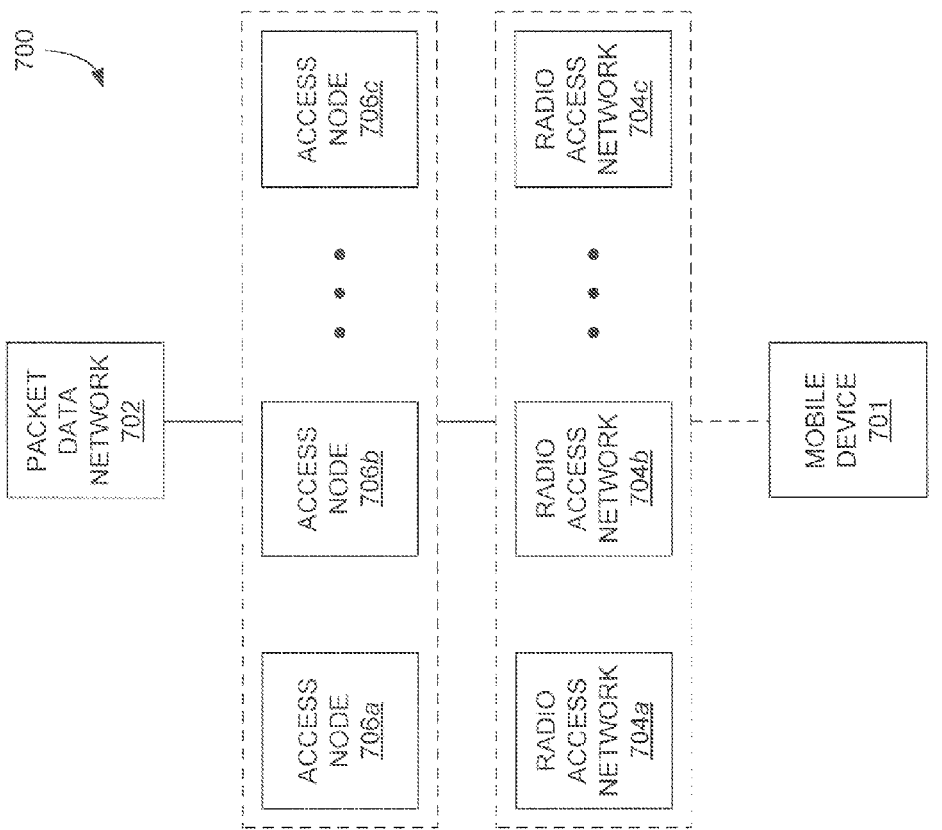
FIG. 7 is a simplified block diagram of a communication network according to an embodiment of the invention that utilizes state information in providing communication services to a mobile device.

FIG. 7 generally depicts a communication network 700 utilizing state information in providing communication services to a mobile device 701. Included is a packet data network 702, a plurality of radio access networks 704a, 704b, 704c configured to communicate with a mobile device 701, and a plurality of access nodes 706a, 706b, 706c coupling the packet data network 702 with the radio access networks 704. Collectively, the access nodes 706 are configured to facilitate each of a number of packet data flows between the mobile device 701 and the packet data network 702 by way of the one of the radio access networks 704 and one of the access nodes 706. The access nodes 706 are further configured to exchange state information for each of the packet data flows among those of the access nodes 706 facilitating at least one of the packet data flows so that each of those access nodes 706 possesses the state information for each of the packet data flows. In addition, the access nodes 706 are configured to employ the state information to select one of the access nodes 706 for facilitating one of the packet data flows.

Figure 8:
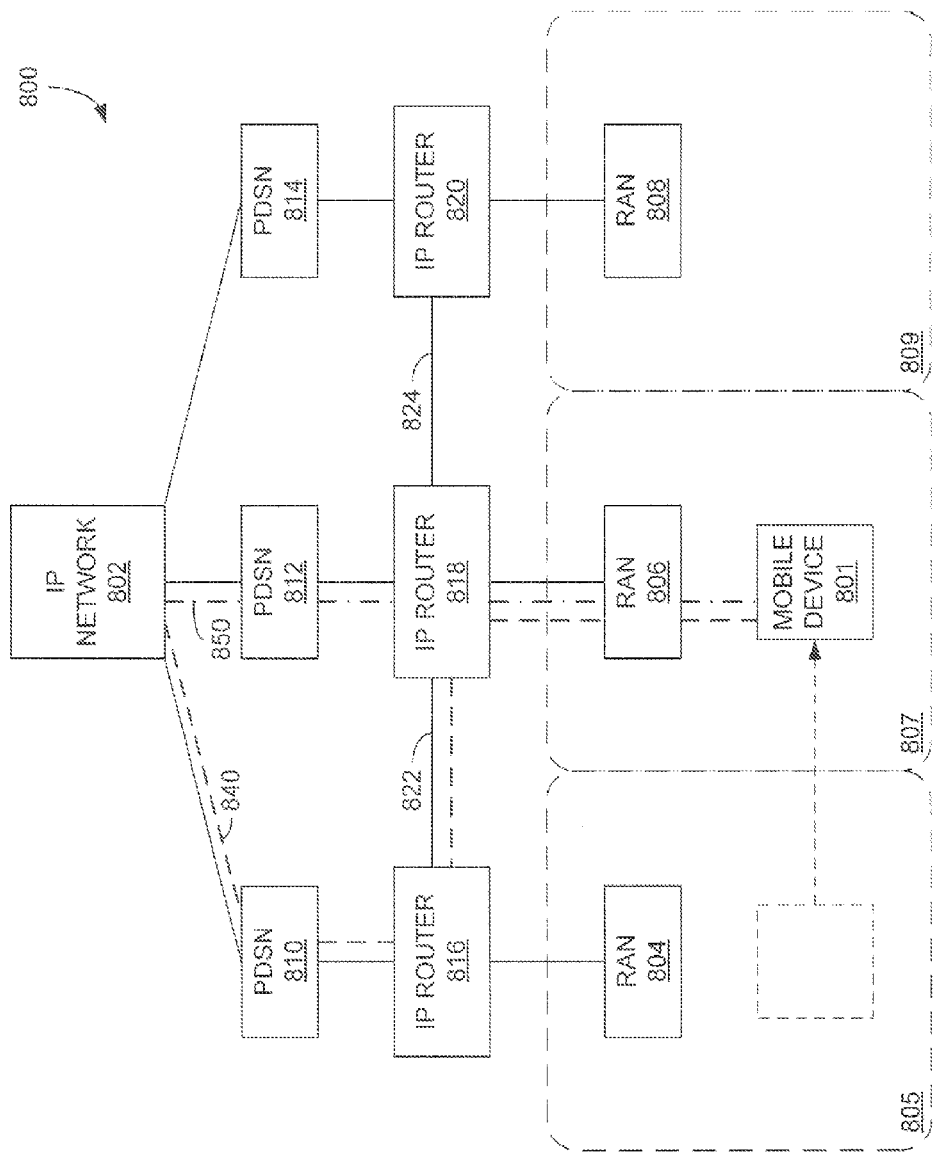
FIG. 8 is a simplified block diagram of a communication network according to another embodiment of the invention that utilizes state information in providing communication services to a mobile device.

Another communication network 800 according to a particular embodiment is presented in FIG. 8. Included in this particular network 800 are an IP network 802 coupled with a first PDSN 810, a second PDSN 812, and a third PDSN 814, each of which acts as an access node for facilitating access to the IP network 802. In one implementation, the IP network 802 may provide access by way of a home agent (not shown in FIG. 8) to the Internet or other customer services (also not shown in FIG. 8) in a fashion similar to that displayed in FIGS. 4A-4C. Coupled by way of a first IP router 816 to the first PDSN 810 is a RAN 804 capable of servicing a mobile device 801 located in a first area 805. Similarly, a second IP router 818 couples the second PDSN 812 with a second RAN 806 servicing a second area 807, and a third IP router 820 couples the third PDSN 814 to a third RAN 808 servicing a third area 809. Various other components possibly implemented in the network 800, such as the BTSes, RAN aggregation routers, and RNCs shown in FIGS. 4A-4C, are omitted from FIG. 8 to promote clarity in the following discussion.

As shown in FIG. 8, the mobile device 801 is located in the second area 807, and is thus be serviced by the second RAN 806 after previously being serviced by the first RAN 804. At that point, the communication network 800 facilitates two IP data flows concurrently: a first IP data flow 840 routed through the first PDSN 810, the first IP router 816, the second IP router 818 and the second RAN 806; and a second data flow 850 routed through the second PDSN 812, the second IP router 818 and the second RAN 806. In a situation similar to that exemplified in FIG. 4B, the first IP data flow 840 was initiated while the mobile device 801 was located in the first area 805, thus being serviced by the first RAN 804. In response to the mobile device 801 moving from the first area 805 to the second area 807, the first IP data flow 840 is still directed through the first PDSN 810, but is then rerouted by way of the first IP router 816, the second IP router 818, and the second RAN 806 to the mobile device 801. As described above, continuing to anchor the first IP data flow 840 eliminates delays caused by a handoff from the first PSDN 810 to the second PDSN 812. For the second IP data flow 850, the second PDSN 812 is chosen to facilitate the second IP data flow 850 because the second IP data flow is initiated while the mobile device 801 is located in the second area 807. As discussed earlier in relation to FIGS. 4A-4C, each of the data flows 840, 850 may include an IP session between the IP network 802 and a PDSN 810, 812, and a PPP session between the PDSN 810, 812 and the second RAN 806.

Since the mobile device 801 is engaged in two concurrent IP data flows 840, 850, each facilitated by a different PDSN 810, 812, the first PDSN 810 may not be cognizant of the existence of the second IP data flow 850, while the second PDSN 812 may not be aware of the presence of the first IP data flow 840. For example, in a fashion corresponding to that discussed above, the first RAN 804 may have alerted the second RAN 806 concerning the ongoing first IP data flow 840 by way of a signal through the first IP router 816 and the second IP router 818 in response to a handoff of the mobile device 801 from the first RAN 804 to the second RAN 806. The second RAN 806 then processes that signal to direct the first IP data flow 840 through the first PDSN 810 to the second RAN 806. As a result, the second PDSN 812 likely is not aware of the first IP data flow 440. Similarly, since the second IP data flow 450 was routed directly to the second RAN 806 through the second PDSN 812, the first PDSN 810 has no knowledge of the second IP data flow 450.

While neither the first or second PDSN 810, 812 necessarily needs to be aware of the presence of another IP data flow with which it is not associated in order to facilitate the first and second IP data flows 440, 450, respectively, extenuating circumstances often experienced in the transfer of an IP data flow may make such information valuable. For example, an extended interruption in the first IP data flow 440 through the first PDSN 810 while the second RAN 806 is servicing the mobile device 801 may cause the overlying IP session to terminate prematurely, causing the communication network 800 to attempt to reestablish the session and initiate another IP data flow. Since the second PDSN 812 may be the access node most closely coupled with the second RAN 806 (such as when they are co-located at the same switch site, as shown in FIGS. 4A-4C), a path for the new data flow incorporating the second PDSN 812 is likely to be the most optimal in terms of speed and latency. However, since the second PDSN 812 did not facilitate the first IP data flow 440, the second PDSN 812 may not possess any prior knowledge of the data flow 440 or its associated session. Thus, this information must be gathered from other sources, such as the first PDSN 810 that facilitated the first IP data flow 440, thus causing a delay before the second PDSN 812 may initiate the new IP data flow.

Figure 9:
FIG. 9 is a flow diagram of a method for exchanging state information within the communication network of FIG. 8 according to an embodiment of the invention.

To prevent such a delay in reinitiating a data flow for its associated IP session, information related to the first IP data flow 840, as well as other data flows, may instead be exchanged between the various PDSNs servicing the mobile device 801. Regarding the particular example of FIG. 8, this information may be exchanged between the first and second PDSNs 810, 812 according to a method 900 shown in FIG. 9.

According to the method 900, the second RAN 806 generates a first signal indicating the presence of the first IP data flow 840 (operation 902) and transmits the first signal to the second PDSN 812 (operation 904). These operations may occur, for example, in response to the initiation of the second IP data flow 850 through the second PDSN 812 and the second RAN 806 to alert the second PDSN 810 of the pre-existing first IP data flow 840. In response to the first signal, the second PDSN 810 generates a second signal indicating state information for the second IP data flow 850, which the second PDSN 812 services (operation 906), and transmits the second signal to the first PDSN 810 (operation 908). Accordingly, in response to the second signal, the first PDSN 810 generates a third signal indicating state information for the first IP data flow 840 (operation 910), and transmits the third signal to the second PDSN 812 (operation 912). As a result of these transmitted signals, the first and second PDSNs 810, 812, each of which facilitates an IP data flow between the IP network 802 and the mobile device 801, acquires and combines the state information for each of the data flows in which the mobile device 801 is involved (operation 914). In one implementation, this information is combined by way of a data "union" into a single data flow state table in each of the first and second PDSNs 810, 812 so that each of the first and second PDSNs 810, 812 essentially hold identical copies of the same state table. Also, in the particular example of FIG. 8, each of the first, second, and third signals is transmitted through one or both of the first IP router 816 and the second IP router 818.

Figure 10:
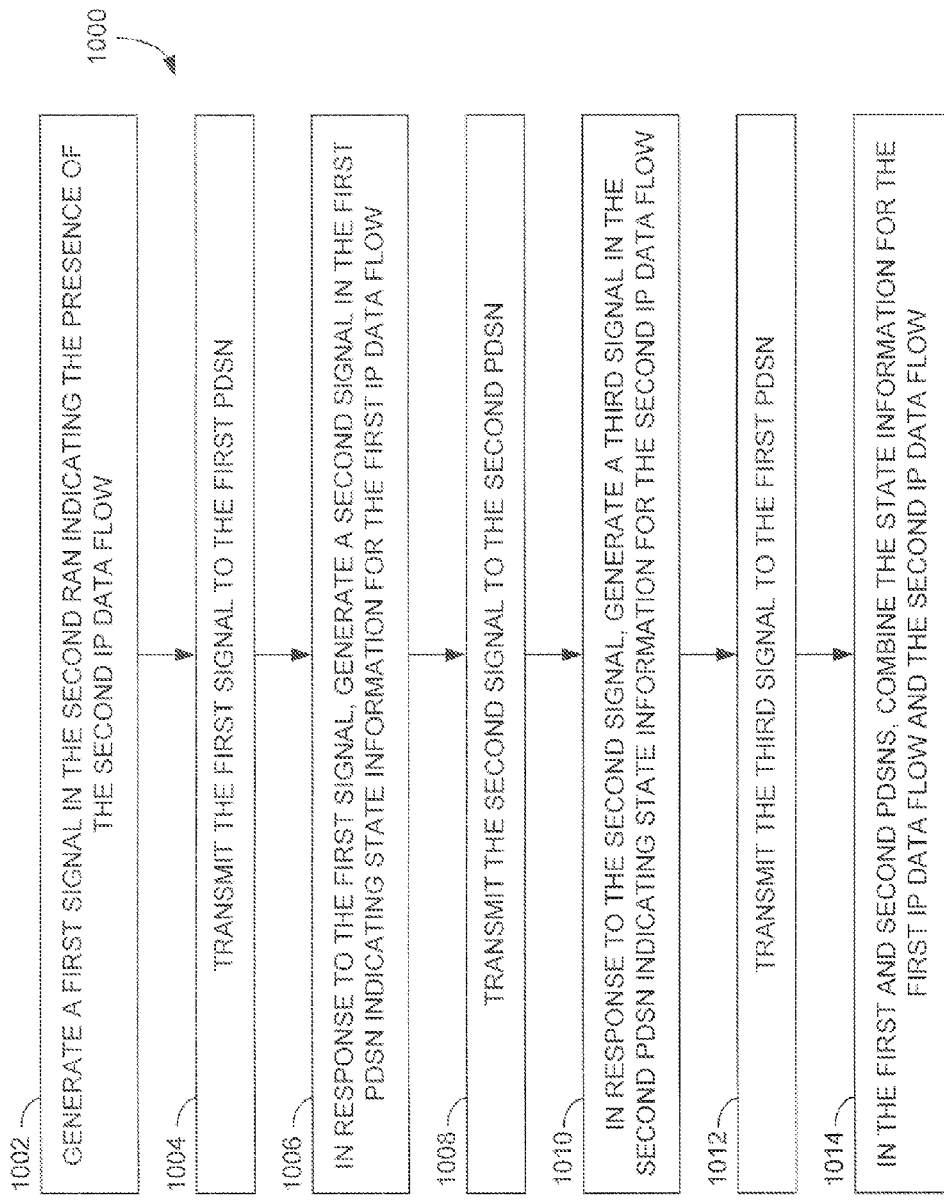
FIG. 10 is a flow diagram of a method for exchanging state information within the communication network of FIG. 8 according to another embodiment of the invention.

In an alternative method 1000 presented in FIG. 10, the information exchange may begin by way of the second RAN 806 generating a first signal indicating the presence of the second IP data flow 850 (operation 1002), and transmitting the first signal to the first PDSN 810 (operation 1004). Similar to the method 900 discussed above, these operations may be undertaken in response to the initiation of the second IP data flow through the second PDSN 812 and the second RAN 806 to alert the first PDSN 810 of the newer second IP data flow 850. In response to the first signal, the first PDSN 810 then generates a second signal indicating state information for the first IP data flow 840, which the first PDSN 810 facilitates (operation 1006), and transmits the second signal to the second PDSN 812 (operation 1008). Afterward, in response to the second signal, the second PDSN 812 generates a third signal indicating state information for the second IP data flow 850 (operation 1010), and transmits the third signal to the first PDSN 810 (operation 1012). As a result, the first and second PDSNs 810, 812, each of which facilitates an IP data flow between the IP network 802 and the mobile device 801, acquires and combines the state information for each of the data flows in which the mobile device 801 is involved (operation 1014).

Generally, the IP data flow state information comprises any information required or useful for maintenance of the associated IP data flow. Several different types of information may constitute the state information for each of the two IP data flows 840, 850. In one embodiment, the state information for a particular IP data flow may include an identification of the mobile device 801 involved in the data flow, an identification of the RAN (for example, the first RAN 804 or the second RAN 806) facilitating the data flow, and an identification of the access node (such as the first PDSN 810 or the second PDSN 812) facilitating the data flow. Other useful information may include the state of a security firewall, such as what may be implemented within the identified access node. Another example of state information may be a serial tunneling (STUN) status. Serial tunneling is a technique by which older serial communication devices can be coupled with a local area network (LAN), wide area network (WAN) or other communication network.

In other implementations, the IP data flow state information may also include a session identifier and associated session data. The associated session may be an IP session, a PPP session, or a session involving another communication protocol. Several types of session data may be supported, such as, for example, a traffic flow template (TFT), which is often employed to direct data packets to their proper destinations, and to protect against theft of service. In one example, a TFT includes source and destination addresses and ports for the session associated with the particular IP data flow. A TFT may also enable an access node or other network device to discriminate between different types of user packets by way of one or more filters, such as a quality-of-service (QoS) filter. As a result, multiple sessions involving the same destination device, such as the mobile device 801, may be facilitated. Other information often associated with a TFT, such as the treatment of a class of packets in the packet flow, may also be included.

Another example of information related to the session may be an access control list (ACL). In one implementation, the ACL may include a list of network resources and a list of devices or network elements permitted to access those resources. Other types of information related to a session associated with the IP data flow, such as an account session identifier for billing purposes, may be included. One potential advantage of maintaining the session identifier is that a reauthorization of the account need not be performed in the event an IP data flow terminates abruptly and is reinitiated through a different PDSN.

Figure 11:
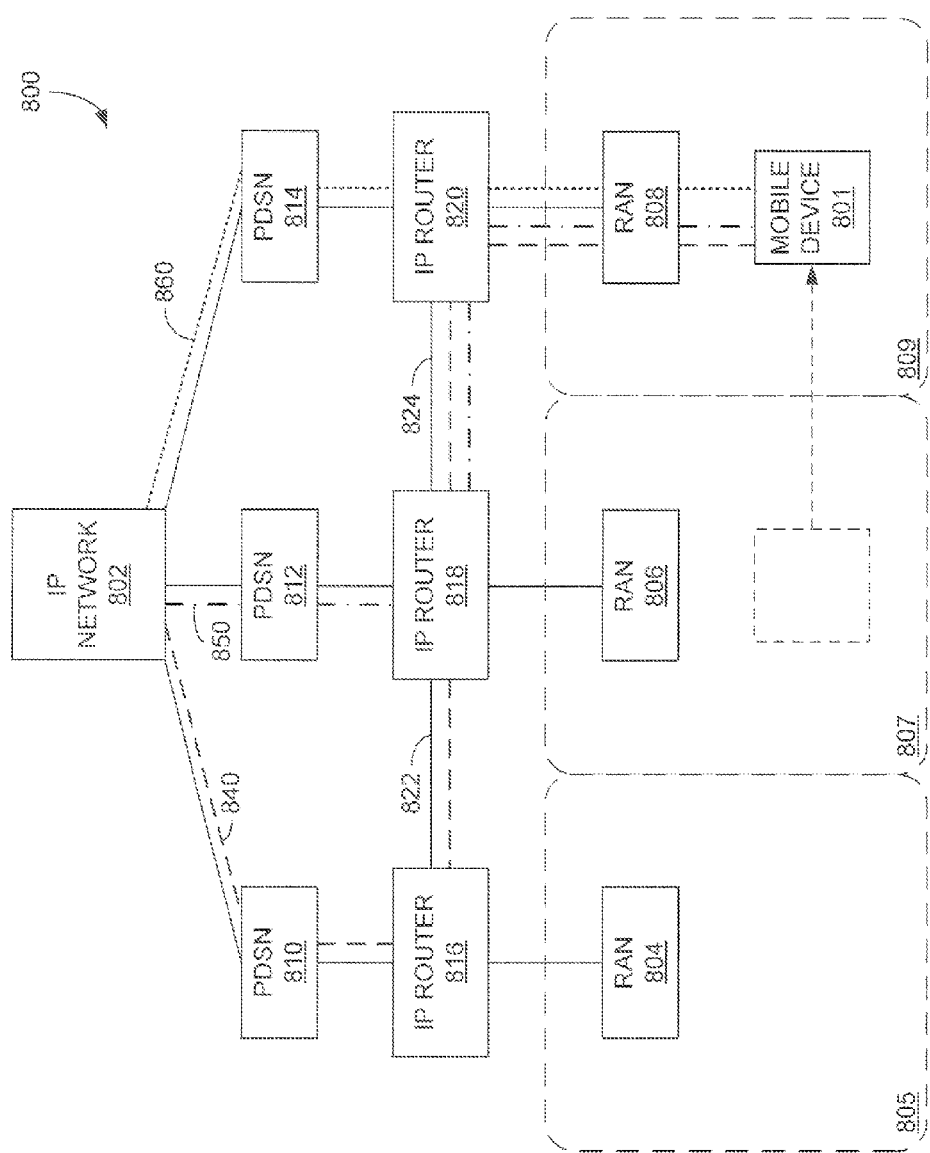
FIG. 11 is a simplified block diagram of the communication network of FIG. 8 in which the mobile device has relocated from an area serviced by one radio access network to an area service by another radio access network.

FIG. 11 provides a logical view of the communication network 800 of FIG. 8 after the mobile device 801 relocates from the second area 807 to the third area 809, thus being serviced by the third RAN 808. As a result of the handoff of the mobile device 801 from the second RAN 806 to the third RAN 808, a signal from the second RAN 806 to the third RAN 808 by way of the second IP router 818 and the third IP router 820 may be generated to indicate to the third RAN 808 the existence of the first and second IP data flows 840, 850 being facilitated by the first and second PDSNs 810, 812, so that these two IP data flows may continue to be facilitated through the third RAN 808. The third RAN 808 may then indicate these new paths to either of the first PDSN 810 and the second PDSN 820, which may then exchange IP data flow state information therebetween to reflect the new (third) RAN 808 servicing the mobile device 801.

In addition, the mobile device 801 may request a third session with the IP network 802 while the data flows 840, 850 associated with the first two sessions are still active. Since the third RAN 808 is coupled most closely with the third PDSN 814, the resulting third IP data flow 860 is likely to be routed between the mobile device 801 and the IP network 802 by way of the third PDSN 814. In response to the new third IP data flow 860, the third RAN 808 may signal any of the PDSNs 810, 812, 814 regarding the one or more data flows not being serviced by the PDSN receiving the signal. In response, state information regarding the data flows 840, 850, 860 may be exchanged between or among all of the PDSNs 810, 812, 814 in a fashion similar to that described above with respect to the methods 900, 1000 presented in FIGS. 9 and 10.

Various embodiments disclosed, as well as variations thereof, are thus likely to improve packet data flow mobility within a communication system involving the delivery of packet-oriented services to mobile communication devices. More specifically, by delaying a handoff at the level of a packet data servicing node when a mobile device migrates from one radio access network to another, the current packet data flow may be maintained until its natural conclusion. Thus, unintended and unwanted disruptions or delays in the packet data flow, especially a flow related to a VoIP call or streaming audio and video programming, as a result of a roaming mobile device may be reduced or eliminated. In some embodiments, the use of state information regarding active packet data flows may be exchanged among access nodes servicing a particular mobile device to expedite the initiation and re-initiation of one or more of the flows, thus further reducing latency or interruptions in the flows.

The various methods discussed herein may be embodied in one or more storage media containing instructions executable on one or more processors for performing the methods. In other embodiments, the methods may be embodied exclusively in hardware, or in a combination of hardware and software. Each of the processors may be, for example, a general purpose computer, a computer designed for the specific purposes discussed herein, an embedded processor, multiple processors coupled together, or any combination thereof.

While several embodiments of the invention have been discussed herein, other embodiments encompassed within the scope of the invention are possible. For example, while particular mention has been made of IP networks, connections, paths and flows, communication networks employing other packet-oriented communication protocols may benefit from application of the principles discussed herein. In addition, aspects of one embodiment may be combined with aspects of other embodiments disclosed above to produce additional embodiments not heretofore discussed. Thus, while the present invention has been described in the context of specific embodiments, such descriptions are provided for illustration and not limitation. Accordingly, the proper scope of the present invention is delimited only by the following claims.

What is claimed is:

1. A method for providing communication services to a mobile device, the method comprising:
    coupling a plurality of base stations with a packet data network by way of a plurality of packet data servicing nodes;
    facilitating each of a plurality of packet data flows concurrently between the mobile device and the packet data network by way of one of the base stations and a different one of the packet data servicing nodes for each of the plurality of packet data flows;
    exchanging state information for each of the packet data flows among those of the packet data servicing nodes facilitating at least one of the packet data flows so that each of the packet data servicing nodes facilitating at least one of the packet data flows possesses the state information for each of the packet data flows; and
    selecting one of the packet data servicing nodes for facilitating one of the packet data flows based on the state information.

2. The method of claim 1, wherein:
    the packet data network comprises an internet protocol network; and
    at least one of the packet data flows comprises an internet protocol data flow.

3. The method of claim 1, wherein:
    each of the packet data flows comprises one of a voice-over-internet-protocol call, a file transfer, an audio stream, and a video stream.

4. The method of claim 1, wherein the state information for each of the packet data flows comprises at least one of an identification of the mobile device, an identification of the base station facilitating the associated packet data flow, an identification of the packet data servicing node facilitating the associated packet data flow, a session identifier, session data, a firewall state, and a serial tunneling status.

5. The method of claim 1, wherein:
the plurality of base stations comprises a first base station and a second base station;
the plurality of packet data servicing nodes comprises a first packet data servicing node and a second packet data servicing node, wherein the first packet data servicing node is coupled with the first base station and the second base station, and the second packet data servicing node is coupled with the second base station;
the plurality of packet data flows comprises a first packet data flow facilitated by the first packet data servicing node and the second base station, and a second packet data flow facilitated by the second packet data servicing node and the second base station; and
prior to exchanging the state information, the first packet data servicing node comprises state information for the first packet data flow, and the second packet data servicing node comprises state information for the second packet data flow.

6. The method of claim 5, wherein exchanging the state information comprises:
generating a first signal in the second base station indicating the first packet data flow;
transmitting the first signal to the second packet data servicing node;
in response to the first signal, generating a second signal in the second packet data servicing node indicating state information for the second packet data flow;
transmitting the second signal to the first packet data servicing node;
in response to the second signal, generation a third signal in the first packet data servicing node indicating state information for the first packet data flow;
transmitting the third signal to the second packet data servicing node; and
in the first and second packet data servicing nodes, combining the state information for the first packet data flow with the state information for the second packet data flow.

7. The method of claim 6, wherein selecting one of the packet data servicing nodes comprises:
if the mobile device remains in an area served by the second base station and the first packet data flow is interrupted, selecting the second packet data servicing node to facilitate the first packet data flow.

8. The method of claim 6, wherein selecting one of the packet data servicing nodes comprises:
if the mobile device changes location from an area served by the second base station to an area served by a third base station, selecting a third packet data servicing node coupled with the third base station to facilitate a new packet data flow between the mobile device and the packet data network.

9. The method of claim 5, wherein exchanging the state information comprises:
generating a first signal in the second base station indicating the second packet data flow;
transmitting the first signal to the first packet data servicing node;
in response to the first signal, generating a second signal in the first packet data servicing node indicating state information for the first packet data flow;
transmitting the second signal to the second packet data servicing node;
in response to the second signal, generating a third signal in the second packet data servicing node indicating state information for the second packet data flow;
transmitting the third signal to the first packet data servicing node; and
in the first and second packet data servicing nodes, combining the state information for the first packet data flow with the state information for the second packet data flow.

10. The method of claim 9, wherein selecting one of the packet data servicing nodes comprises:
if the mobile device remains in an area served by the second base station and the first packet data flow is interrupted, selecting the second packet data servicing node to facilitate the first packet data flow.

11. The method of claim 9, wherein selecting one of the packet data servicing nodes comprises:
if the mobile device changes location from an area served by the second base station to an area served by a third base station, selecting a third packet data servicing node coupled with the third base station to facilitate a new packet data flow between the mobile device and the packet data network.

12. A non-transitory computer-readable medium comprising instructions executable on a processor for implementing the method of claim 1.

13. A communication network for providing communication services to a mobile device, the system comprising:
a packet data network;
a plurality of base stations configured to communicate with the mobile device;
a plurality of packet data servicing nodes coupling the packet data network with the plurality of base stations, wherein the packet data servicing nodes are configured to:
facilitate each of a plurality of packet data flows concurrently between the mobile device and the packet data network by way of one of the base stations and a different one of the packet data servicing nodes for each of the plurality of packet data flows;
exchange state information for each of the packet data flows among those of the packet data servicing nodes facilitating at least one of the packet data flows so that each of the packet data servicing nodes facilitating at least one of the packet data flows possesses the state information for each of the packet data flows; and
select one of the packet data servicing nodes for facilitating one of the packet data flows based on the state information.

14. The communication network of claim 13, wherein:
the packet data network comprises an internet protocol network; and
at least one of the packet data flows comprises an internet protocol data flow.

15. The communication network of claim 13, wherein:
each of the packet data flows comprises one of a voice-over-internet-protocol call, a file transfer, an audio stream, and a video stream.

16. The communication network of claim 13, wherein the state information for each of the packet data flows comprises at least one of an identification of the mobile device, an identification of the base station facilitating the associated packet data flow, an identification of the packet data servicing node facilitating the associated packet data flow, a session identifier, session data, a firewall state, and a serial tunneling status.

17. The communication network of claim 13, wherein:
the plurality of base stations comprises a first base station and a second base station;
the plurality of packet data servicing nodes comprises a first packet data servicing node and a second packet data servicing node, wherein the first packet data servicing node is coupled with the first base station and the second base station, and the second packet data servicing node is coupled with the second base station;
the plurality of packet data flows comprises a first packet data flow facilitated by the first packet data servicing node and the second base station, and a second packet data flow facilitated by the second packet data servicing node and the second base station; and
prior to exchanging the state information, the first packet data servicing node comprises state information for the first packet data flow, and the second packet data servicing node comprises state information for the second packet data flow.

18. The communication network of claim 17, wherein:
the second base station is configured to generate a first signal indicating the first packet data flow, and transmit the first signal to the second packet data servicing node;
the second packet data servicing node is configured to generate a second signal indicating state information for the second packet data flow in response to the first signal, and transmit the second signal to the first packet data servicing node;
the first packet data servicing node is configured to generate a third signal indicating state information for the first packet data flow in response to the second signal, and transmit the third signal to the second packet data servicing node; and
the first and second packet data servicing nodes are each configured to combine the state information for the first packet data flow with the state information for the second packet data flow.

19. The communication network of claim 18, wherein the packet data servicing nodes are further configured to:
select the second packet data servicing node to facilitate the first packet data flow if the mobile device remains in an area served by the second base station and the first packet data flow is interrupted.

20. The communication network of claim 18, wherein the packet data servicing nodes are further configured to:
select a third packet data servicing node coupled with a third base station to facilitate a new packet data flow between the mobile device and the packet data network if the mobile device changes location from an area served by the second base station to an area served by the third base station.

21. The communication network of claim 17, wherein:
the second base station is configured to generate a first signal indicating the second packet data flow, and transmit the first signal to the first packet data servicing node;
the first packet data servicing node is configured to generate a second signal indicating state information for the first packet data flow in response to the first signal, and transmit the second signal to the second packet data servicing node;
the second packet data servicing node is configured to generate a third signal indicating state information for the second packet data flow in response to the second signal, and transmit the third signal to the first packet data servicing node; and
the first and second packet data servicing nodes are each configured to combine the state information for the first packet data flow with the state information for the second packet data flow.

22. The communication network of claim 21, wherein the packet data servicing nodes are further configured to:
select the second packet data servicing node to facilitate the first packet data flow if the mobile device remains in an area served by the second base station and the first packet data flow is interrupted.

23. The communication network of claim 21, wherein the packet data servicing nodes are further configured to:
select a third packet data servicing node coupled with a third base station to facilitate a new packet data flow between the mobile device and the packet data network if the mobile device changes location from an area served by the second base station to an area served by the third base station.

24. A communication network for providing communication services to a mobile device, the system comprising:
a packet data network;
multiple means for communicating with a mobile device;
multiple means for coupling the packet data network with the multiple communicating means, wherein the multiple coupling means are configured to:
facilitate each of a plurality of packet data flows concurrently between the mobile device and the packet data network by way of one of the multiple communicating means and a different one of the multiple coupling means for each of the plurality of packet data flows;
exchange state information for each of the packet data flows among each of the multiple coupling means facilitating at least one of the packet data flows so that each of the multiple coupling means facilitating at least one of the packet data flows possesses the state information for each of the packet data flows; and
select one of the multiple coupling means for one of the packet data flows based on the state information.

* * * * *